United States Patent [19]
Harmstorf

[11] Patent Number: 4,941,774
[45] Date of Patent: Jul. 17, 1990

[54] METHOD AND AN APPARATUS FOR MOVING A ROPE- OR CABLE-LIKE ELEMENT THROUGH A CABLE CHANNEL PIPE

[75] Inventor: Rudolf Harmstorf, Kosterbergstrasse 40 F, 2000 Hamburg 55, Fed. Rep. of Germany

[73] Assignee: Rudolf Harmstorf, Hamburg, Fed. Rep. of Germany

[21] Appl. No.: 108,908

[22] Filed: Oct. 15, 1987

[30] Foreign Application Priority Data

Oct. 15, 1986 [DE] Fed. Rep. of Germany ....... 3635041

[51] Int. Cl.⁵ ................................................. F16L 1/04
[52] U.S. Cl. ..................................... 405/158; 405/184
[58] Field of Search ............... 405/154, 158, 166, 168, 405/171, 184

[56] References Cited

U.S. PATENT DOCUMENTS

| | | | |
|---|---|---|---|
| 3,401,749 | 9/1968 | Daniel | 405/184 X |
| 3,467,196 | 9/1969 | Kinsman | 405/184 X |
| 3,583,169 | 6/1971 | Morgan | 405/171 |
| 3,603,264 | 9/1971 | Von Arx | 405/166 X |
| 3,756,034 | 9/1973 | Lochridge et al. | 405/171 X |
| 4,498,811 | 2/1985 | Fern et al. | 405/168 |

FOREIGN PATENT DOCUMENTS

| | | | |
|---|---|---|---|
| 0050162 | 4/1982 | European Pat. Off. | 405/171 |
| 108590 | 5/1984 | European Pat. Off. | 405/154 |
| 1138584 | 2/1985 | U.S.S.R. | 405/154 |

Primary Examiner—David H. Corbin
Attorney, Agent, or Firm—Harness, Dickey & Pierce

[57] ABSTRACT

A method for introducing and moving a rope- or cable-like element in and through a cable channel pipe filled with water wherein a flow of water is pumped through the cable channel pipe, and the element is floated through the cable channel pipe jointly with the water flow.

15 Claims, 2 Drawing Sheets

METHOD AND AN APPARATUS FOR MOVING A ROPE- OR CABLE-LIKE ELEMENT THROUGH A CABLE CHANNEL PIPE

BACKGROUND OF THE INVENTION

The invention is referring to a method according to the preamble portion of claim 1.

It is known in connection with the laying of subsoil water cables first to lay the cable channel pipe and thereafter to introduce a thin auxiliary rope in order to draw the cable into and through the pipe by means of the auxiliary rope. If necessary a plurality of auxiliary ropes of increasing thickness and tensional strength can be drawn into the pipe one after the other. In order to reduce the buoyancy the pipe is filled with water immediately after being laid. It is also known to place an auxiliary rope in the cable channel pipe before the laying operation takes place.

In case of large continuous pipe lengths as for instance necessary for the passage of natural waters considerable forces are to be applied to in order to draw the auxiliary ropes or the cable through the pipe regardless the lubrication by the water in the pipe, in particular if a plurality of curves or radii are caused by the cross profile of a river bed. It has turned out that a nylon auxiliary rope of 5 mm thickness may be torn off in a pipe of a length of 3 km if a further rope or a cable is to be drawn into the pipe.

The object of the invention is to provide a method by which a rope-like or cable-like elongated element can be moved into a cable channel pipe filled with water in a more simple and operation-safe manner.

SUMMARY OF THE INVENTION

In contrast to the conventional technique with the method according to the invention the water within the cable channel pipe is not used as lubrication means, rather is to be regarded and applied as frictional propelling medium.

This results in the considerable advantages that the propelling force increases with the length of the cable channel pipe, and that due to the relative velocity between the water flow, the propelled element and the wall of the cable channel pipe a remarkable improved lubrication effect is achieved between the element and the cable channel pipe if compared with stagnant water so that the frictional forces between the element and the cable channel pipe are considerably smaller than the propelling force which is exerted through the friction on the element by the water flow. The conveying power for the water flow is substantially dependent on the friction between the water flow and the cable channel pipe and can be conveniently afforded by a correspondingly dimensioned pump. With the pump having a conveying power of 50 kW with 10 bar overpressure a 10 mm thick steel drawing rope can by no means be moved through a 3.5 km long plastic cable channel pipe having an inner diameter of 70 mm.

The introduction of the propelling water flow can be provided by a tube laterally placed at the cable channel pipe; the element to be introduced can be guided through an annular sealing into the lateral tube. If necessary the friction in the annular sealing can be at least partially overcome by an additional conveying force exerted on the element, for instance through conveying rollers engaging the element.

Preferably the element to be introduced has a smooth surface, e.g. is a plastic rope. It has turned out that the remaining friction at the wall of a cable channel pipe or at already introduced other elements can be held particularly low without disturbingly changing the propelling force.

It is known to move a string or a cord in a conduction pipe by pneumatic means in that pressurized gas is blown through the conduction pipe; the string or cord is supported by the flow forces of the pressurized gas effecting on the string or cord (DE-OS26 04 775). This known method is not applicable to cable channel pipes filled with water. Further, the buoyancy effect of the invention cannot be obtained.

The method accodring to the invention is particularly suited for ropes or cables having a relatively small specific weight, e.g. glass fibre cables. The flow of water by which the element is propelled through the cable channel pipe cause a floating of the element so that a friction at the wall of the cable channel pipe does not occur or only to a small extent, above all adjacent pipe bends. In order to improve the centering effect of the element in the cable channel pipe an embodiment of the invention provides that the flow of water is introduced in the cable channel pipe uniformly about the circumference of the element. To this purpose an annular passage can be placed around the cable channel pipe, the annular passage having radial opening spaced in circumferential direction and leading to the interior of the cable channel pipe, and the annular passage being connected to a lateral water supply tube. This kind of introduction of water immediately leads to a centering of the element in the cable channel pipe. Preferably the openings are provided by nozzles, the axes thereof being inclined with respect to the flow direction in the pipe.

In case a plurality of bends and relatively narrow bends the danger of too large friction in the cable channel pipe may be encountered. According to a further embodiment of the invention it is appropriate to connect guiding or distance bodies with the element. These bodies retain the element in a distance from the wall of the cable channel pipe. The bodies have a diameter significantly smaller than the diameter of the cable channel pipe, otherwise a sufficient flow velocity cannot be achieved in the cable channel pipe. Preferably, the diameter of the bodies is approximately three quarters of the pipe diameter. It is particularly advantageous if the bodies are defined as floating bodies which compensate for the weight of the element. The bodies can be made of plastic material and if defined as floating bodies can be provided with one or a plurality of internal cavities. The bodies preferably are ball-shaped although other contours can be taken or may be appropriate. If balls are used they can be provided with a radial slot extending beyond the center of the ball, the slot receiving the element. By means of one or a plurality of screw bolts the end thereof protruding in the slot the ball can be secured to the element.

The distance between the bodies applied to the element depend upon the weight of the element and upon the course of the cable channel pipe. In case of a relatively large weight and a multiple bended cable channel pipe smaller distances have to be selected than in case of small weight and a relatively straight cable channel pipe. Appropriate distances are for instance 50 to 100 m.

For the introduction of an element provided with the mentioned bodies a sluice is provided according to a further proposal of the invention, the sluice being defined by two spaced shut-off members and a tube therebetween. The shut-off elements of the shut-off members are designed such that in the closed position thereof the passage of the element is permitting while the passage of the bodies is only possible in the opening position of the shut-off elements. By this it is prevented that pressurized water leaks out in an undesirable amount when the element including the bodies is introduced.

The method of the invention has the great advantage that the cable is not loaded with logical high tensional stresses, and high thrust forces against the pipe wall normally occuring in pipe bends if high tension forces are exerted This is above all important for sensitive cables.

The advantages of the method according to the invention is independent from whether the cable channel pipe is placed subsoil water or otherwise. It is particularly advantageous where large lengths are to be bridged over.

In order to enlarge the buoyancy effect on the element in the pipe a liquid can be used for the floating of the element which has a higher specific weight than water, e.g. a salt solution.

BRIEF DESCRIPTION OF THE DRAWINGS

The invention is explained hereinafter along examples of embodiments according to the invention illustrated by drawings.

DETAILED DESCRIPTION OF THE PREFERRED EMBODIMENTS

Figure 1:
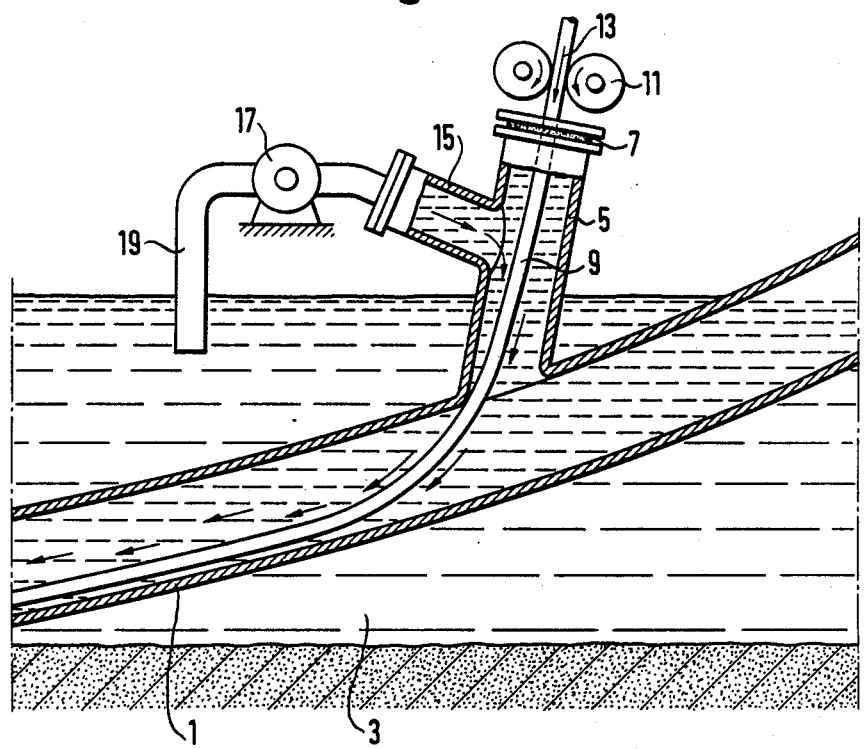
FIG. 1 shows a schematic illustration of the end portion of the cable channel pipe and the means necessary for introducing a rope-like element.

FIG. 1 shows a cable channel pipe 1 which has been laid in a water 3 and has been filled with water. In most cases the pipe is placed in the soil. To cary out the method an extension tube 5 is obliquely placed at the pipe 1 at a location allowing a simple access, normally at the end portion of the cable channel pipe as illustrated, the extension tube having a flange at its free end including an annular seal 7. The element 9 to be drawn in, e.g. a plastic rope, is guided through the annular seal 7 and is subjected to an additional conveying force 13 by means of driven rollers 11 just before the annular seal. The distance between the rollers 11 and the annular seal is selected small so that a lateral yielding by bending of the element 9 is excluded by the stiffness of the element 9. By the additional conveying force 13 the friction occurring in the annular seal 7 can be at least partially overcome. The extension tube 5 has a fitting 15 to which a water pressure pump 17 is connected. In the illustrated embodiment the inlet 19 of the pressure pump 17 is supplied by the waters 3. In some case the water can be taken from existing networks.

It is understood that the cable channel pipe 1 has to be closed at the right end in FIG. 1. This is not shown in FIG. 1.

Figure 2:
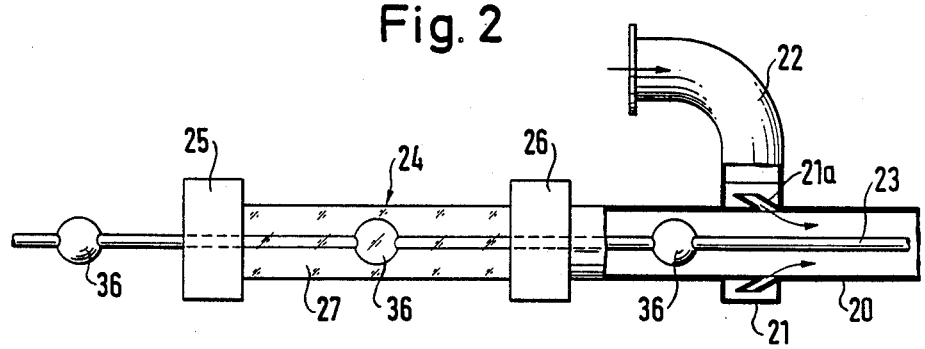
FIG. 2 shows schematically a further embodiment of the means for moving a rope-like element in the channel pipe.

In the embodiment according to FIG. 2 a cable channel pipe 20 is provided surrounded by an annular pasaage 21. The annular passage is connected to the interior of the cable channel pipe 20 through nozzles 21a spaced in circumferential direction. The nozzles have an axis inclined to the pipe axis. It should be noted that the nozzles 21a do not extend in the pipe 20. The annular passage 21 is provided with a lateral pipe bend 22 through which the pressurized water is supplied (not shown). The supply of pressurized water can be carried out in a manner as shown in FIG. 1. The pressurized water flowing in a uniform manner about the circumference of the element exerts a centering effect on the rope or the glass fiber cable 23 which by this is approximately guided along the center of pipe 20.

Figure 3:
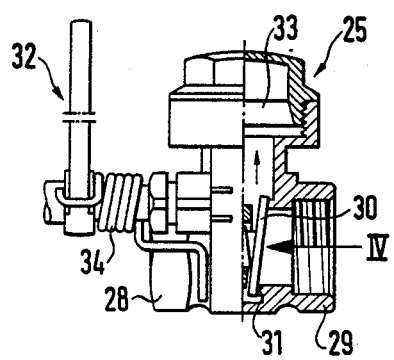
FIG. 3 shows a side view partially in cross section of a shut-off member for a sluice of the means according to FIG. 2.

A sluice 24 is connected to the cable channel pipe 20 at the rear end thereof. It consists of two spaced shut-off members 25, 26, a connection tube 27 being located therebetween made of transparent material. The shut-off member 25 is illustrated in FIG. 3. It has an inlet portion 28 and an outlet portion 29, a shut-off element 30 having the shape of a circular plate or disc being located therebetween, and the place co-operating with a sealing seat 31 in its closed position. The plate 30 can be moved into an upper chamber 33 by means of a linkage system 32 so that a passage is established between the portions 28, 29 throughout the total pipe cross section. The linkage 32 is biased by a coil spring 34 so that plate 30 automatically reverts to its closed portion if the actuation of the linkage 32 has been terminated.

Figure 4:
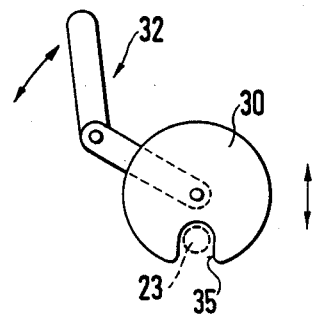
FIG. 4 shows the front view of the shut-off element of the shut-off member of FIG. 3 if viewed in the direction of arrow 4 according to FIG. 3.

As can be seen in FIG. 4 the plate 30 has a radial recess 35 in the lower portion thereof. Its width is dimensioned such that it can receive the cable or the rope 23 as indicated by dotted lines.

As can be seen in FIG. 2 ball members 36 are conected to the rope or the cable 23. In FIG. 2 the ball members 36 are shown in a relative short distance from each other. In reality the distance is about a plurality of meters, e.g. 50 to 100 m, the distance depending upon the weight of the cable 23 or the course of the cable channel pipe 20, respectively. The ball members 36 can be made of buoyant material or can be provided with internal cavities, respectively, so that they are adapted to floatingly support the cable or rope 23 in pipe 20. Since the rope 23 is compeletely or partially conveyed through the water flow in pipe 20 the ball members 36 have to have a smaller diameter than that of pipe 20. In FIG. 2 the ball members 36 have a relatively large diameter. In reality this diameter is about 75% of the diameter of pipe 20.

Figure 5:
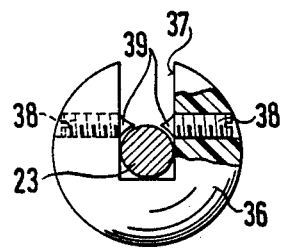
FIG. 5 shows partially in cross section a ball-like body to be connected to the element.

In FIG. 5 a ball member 36 of plastic material is illustrated. It can be seen that it has a throughout radial slot 35 extending beyond the center of the ball member. It serves for the receipt of the cable or rope 23. If the cable 23 is completely received it extends approximately along a diameter of the ball member 36. It can be seen further that two oppositely located worm screws 38 are inserted in threaded bores of ball member 36. They have wedge-like points 39. They serve for the securing of ball member 36 on cables 23. The points 39 can be concavely formed in order to achieve an adaptation to the surface contour of cable 23.

In case of feeding the cable 23 in the cable channel pipe 20, first the shut-off member 25 is opened while shut-off member 26 reamains closed. Thus, ball member 36 can enter the connection pipe 27 through the opened shut-off member 25. The closed shut-off member 26 enables the pasaage of cable 23. If the ball member is within the connection tube 27 the shut-off member 25 is closed and the shut-off member 26 is opened so that the ball member 36 can enter the cable channel pipe 20. Through the clear material of connection tube 27 it can be controlled whether cable 23 is completely received by the recess 35 in plate 30.

I claim:

1. Method for conveying a cable through a cable channel pipe, comprising the steps of at least partially submerging the pipe in a body of water, effecting a continuous flow of water through the pipe, affixing one or more buoyant guiding members to the cable to buoy the cable in the flow of water, and conveying the cable along the length of the pipe by friction between the effected water flow and the cable.

2. The method according claim 1, characterized in that the cable has a smooth surface.

3. The method according to claim 1, characterized in that the cable is introduced in the water flow through an annular seal.

4. The method acording to claim 3, characterized in that an additional conveying force is exerted on the cable acting against the friction caused by the annular seal.

5. The method according to claim 1, characterized in that the flow of water is approximately uniformly fed about the circumference of the cable in the cable channel pipe.

6. A method according to claim 1 further comprising releaseably affixing one or more buoyant guiding members to the cable at spaced positions along the length of the cable, the external diameter of the one or more buoyant guiding members being smaller than the inner diameter of the cable channel pipe, enabling the flow of water to pass between the outer surface of the members and inner wall of the pipe.

7. A method according to claim 1 further comprising releasably affixing one or more buoyant guiding members to the cable at spaced locations along the length of the cable, the outer surface of the one or more buoyant guiding members having relatively little friction with the flow of water and having an external diameter which is smaller than the inner diameter of the cable channel pipe, enabling the flow of water to pass between the outer surface of the members and inner wall of the pipe.

8. A method according to claim 6 characterized in that the one or more buoyant guiding members are ball-like.

9. The method according to claim 8 further comprising providing the ball-like members with a recess for the receipt of the cable and providing at least one screw in each ball-like member having a front end adapted to be displaced in the recess to secure the ball-like members to the cable.

10. The method according to claim 6 characterized in that the buoyant members are made of plastic material.

11. The method according to claim 10 further comprising providing the one or more buoyant members with at least one internal cavity.

12. The method according to claim 6 further comprising introducing the cable having one or more buoyant members affixed thereto into the cable channel pipe through a sluice.

13. The method according to claim 12 further comprising providing the sluice with two spaced shut-off members each having shut-off elements which allow the passage of the cable in the closed position thereof and also allow the passage of the one or more buoyant members in the opened position thereof.

14. The method according to claim 13 further comprising providing the shut-off elements with slides having a recess, the width thereof slightly larger that the diameter of the cable.

15. The method according to claim 5 further comprising placing an annular chamber about the cable channel pipe, connecting the annular chamber to the cable pipe through a plurality of circumferentially spaced openings having axes inclined to the flow direction, and connecting the annular chamber to a lateral water supply tube.

* * * * *